United States Patent
Hu et al.

(10) Patent No.: US 11,627,528 B2
(45) Date of Patent: Apr. 11, 2023

(54) METHOD OF MULTI-ACCESS EDGE COMPUTING TASK OFFLOADING BASED ON D2D IN INTERNET OF VEHICLES (IOV) ENVIRONMENT

(71) Applicant: South China University of Technology, Guangzhou (CN)

(72) Inventors: Bin-jie Hu, Guangzhou (CN); Sheng-he Lu, Guangzhou (CN)

(73) Assignee: South China University of Technology, Guangzhou (CN)

(*) Notice: Subject to any disclaimer, the term of this patent is extended or adjusted under 35 U.S.C. 154(b) by 81 days.

(21) Appl. No.: 17/185,013

(22) Filed: Feb. 25, 2021

(65) Prior Publication Data
US 2021/0266834 A1    Aug. 26, 2021

(30) Foreign Application Priority Data
Feb. 25, 2020 (CN) .......................... 202010114913.1

(51) Int. Cl.
| | |
|---|---|
| H04W 4/00 | (2018.01) |
| G06F 15/173 | (2006.01) |
| G06F 15/16 | (2006.01) |
| G06F 9/46 | (2006.01) |
| H04W 52/02 | (2009.01) |
| H04W 4/46 | (2018.01) |
| H04W 4/44 | (2018.01) |
| H04W 4/70 | (2018.01) |
| H04W 72/02 | (2009.01) |

(52) U.S. Cl.
CPC ......... *H04W 52/0219* (2013.01); *H04W 4/44* (2018.02); *H04W 4/46* (2018.02); *H04W 4/70* (2018.02); *H04W 72/02* (2013.01)

(58) Field of Classification Search
CPC ..... H04W 52/0219; H04W 4/46; H04W 4/44; H04W 4/70; H04W 72/02
USPC ......................................................... 370/329
See application file for complete search history.

(56) References Cited

U.S. PATENT DOCUMENTS

| | | | |
|---|---|---|---|
| 2018/0183855 A1* | 6/2018 | Sabella | H04W 52/0264 |
| 2021/0136142 A1* | 5/2021 | Dong | G06F 9/5033 |
| 2022/0050725 A1* | 2/2022 | Gehrling | G06F 9/5038 |

* cited by examiner

*Primary Examiner* — Mark G. Pannell
(74) *Attorney, Agent, or Firm* — Bochner IP, PLLC; Andrew D. Bochner

(57) ABSTRACT

The present disclosure discloses a method of multi-access edge computing task offloading based on D2D in IoV environment, which models a task offloading strategy, a transmission power and a channel resource allocation mode as a mixed integer nonlinear programming problem, wherein an optimization problem is to maximize the sum of time delay and energy consumption benefits of all CUE in cellular communication with a base station in the IoV system. This method has low time complexity, may effectively utilize channel resources of the IoV system, and ensures the delay reliability of the DUE for which the local V2V data exchange is performed in the form of D2D communication. In the meantime, the time delay and energy consumption of CUE are both close to the minimum, thus meeting the IoV requirements of low time delay and high reliability.

6 Claims, 8 Drawing Sheets

METHOD OF MULTI-ACCESS EDGE COMPUTING TASK OFFLOADING BASED ON D2D IN INTERNET OF VEHICLES (IOV) ENVIRONMENT

TECHNICAL FIELD

The present disclosure relates to the technical field of wireless communication and IoV, and particularly to a method of multi-access edge computing task offloading based on D2D in the IoV environment.

BACKGROUND

With the rapid development of IoV, vehicles have become smarter in supporting intelligent applications (automatic driving, real-time video assistance, navigation and interactive games). Vehicle communication both improves road safety and transportation efficiency and provides more diverse entertainment scenes. For services requiring the exchange of mass data, such as media streaming and content sharing, a large communication capacity is obtained through the Vehicle to Infrastructure (V2I) link. At the same time, information that is critical to safety, such as cooperation awareness information and discrete environmental notification information, usually needs to spread safety-related information among surrounding vehicles in a periodic or event-triggered manner, so that the vehicle-to-vehicle (V2V) technique is necessary to meet strict reliability and timeliness requirements.

Multi-access mobile edge computing (MEC) is an extension of the mobile edge computing. Mobile-edge computing is a kind of network architecture, which utilizes a wireless access network to provide IT services required by telecom users and cloud computing functions nearby, thus creating a carrier-class service environment with high performance, low delay and high bandwidth, accelerating the rapid download of various contents, services and applications in the network, allowing consumers to enjoy uninterrupted high-quality network experience, and solving the problems such as the network delay, congestion and capacity in the future. Multi-access mobile edge computing further extends the edge computing from the telecom cellular network to other wireless access networks (such as WiFi), which may improve the user experience and save bandwidth resources on the one hand, and provide the third-party application integration by sinking the computing power to mobile edge nodes on the other hand, thereby providing infinite possibilities for service innovation of mobile edge portals.

Task offloading refers to submitting a user's task to the edge computing server for execution, so as to achieve the requirements of saving time delay and energy consumption. The research of task offloading strategy aims at designing a user task offloading strategy that achieves the lowest time delay and energy consumption of the IoV system, and as a result, according to the task offloading strategy, the user may choose to execute the task locally or to perform the computation by offloading the task to the edge computing server.

Generally, in most existing operations, the multi-access edge computing task offloading only takes into consideration the time delay and energy consumption minimization of the V2I link without guaranteeing the time delay reliability of V2V, thus failing to meet the reliability requirement of the IoV. The minimization of time delay and energy consumption is usually a mixed integer nonlinear programming problem which requires high computational complexity and iteration for several times when using algorithms such as the local search.

SUMMARY

For this purpose, the present disclosure aims at providing a method of multi-access edge computing task offloading based on D2D in IoV environment, which can address the time delay and energy consumption minimization in the IoV system with low time complexity.

This purpose of the present disclosure is achieved through the following technical schemes:

A method of multi-access edge computing task offloading based on D2D in IoV environment, which applies to the following scenario: an edge computing server is deployed near a single base station, wherein: the base station adopts the OFDMA access mode and has a certain number of CUE (abbreviation of cellular user equipment) and DUE (abbreviation of D2D user equipment) in its coverage area; CUE can communicate with the base station; task requests generated by CUE may choose to be executed at the local of CUE or the edge computing server; the local data exchange is performed between DUE in the form of D2D; DUE multiplexes CUE channels, thus causing communication interference between CUE and DUE. The method includes the following steps:

In Step 1, an optimization problem is modeled as a problem of maximizing the sum of time delay and energy consumption benefit, wherein the benefit is defined as a ratio of a difference between the local execution cost and the actual execution cost to the local execution cost, the cost herein represents the time delay or energy consumption, and the optimization problem is equivalent to the problem of minimizing the sum of time delay and energy consumption;

In Step 2, the optimization problem is decomposed, wherein a sub-optimization problem of the task offloading strategy is independent from that of the transmission power and channel resource allocation mode, thereby decomposing the optimization problem into two sub-optimization ones: one for the task offloading strategy, and the other one for the transmission power and channel resource allocation mode;

In Step 3, optimal transmission powers of CUE and DUE are computed, wherein according to the known D2D time delay reliability limit condition and power limit conditions of CUE and DUE, an feasible region of CUE and DUE powers are determined, and then a linear programming is used for obtaining the optimal transmission power of CUE and DUE;

In Step 4, an optimal channel resource allocation mode is computed, wherein the optimal channel resource allocation mode is acquired by solving a problem of maximum weight matching in bipartite by using a bipartite matching algorithm;

In Step 5, an optimal task offloading strategy is computed, wherein the optimal task offloading strategy of CUE is acquired by solving a knapsack problem by using dynamic programming.

Further, the process of Step 1 is as follows:

It is assumed that the number of CUE is M, m represents the $m^{th}$ CUE, the number of DUE is K pairs, and k represents the $k^{th}$ pair of DUE. Since the channel is less used, it facilitates the management of the base station interference. In order to improve the spectrum usage efficiency, the channel allocated for CUE is multiplexed by DUE, and a total bandwidth of the base station is B.

Signal-to-noise ratios of the $m^{th}$ CUE and the $k^{th}$ pair of DUE received by the base station are respectively:

$$\gamma_m = \frac{p_m h_{m,B}}{\sigma^2 + \sum_{k \in K} \rho_{m,k} p_k h_{k,B}}$$

and $$\gamma_k = \frac{p_k h_k}{\sigma^2 + \sum_{m \in M} \rho_{m,k} p_m h_{m,k}}$$

Wherein $p_m$ and $p_k$ represent transmission powers of the $m^{th}$ CUE and $k^{th}$ pair of DUE respectively, $h_{m,B}$ is a channel gain between the $m^{th}$ CUE and the base station, $h_{k,B}$ is a channel gain between the $k^{th}$ pair of DUE and the base station, $h_k$ is a channel gain between the $k^{th}$ pair of DUE, $h_{m,k}$ is a channel gain between the $m^{th}$ CUE and the $k^{th}$ pair of DUE, $\sigma^2$ is a noise power, $\rho_{m,k}$ is a channel resource allocation mode, $\rho_{m,k}=1$ indicates that the $k^{th}$ pair of DUE multiplexes the channel of the $m^{th}$ CUE, or otherwise $\rho_{m,k}=0$ indicates that the $k^{th}$ pair of DUE does not multiplex the channel of the $m^{th}$ CUE.

In the above formulas, the channel gains only take into consideration large-scale gains which include:

$h_{m,B} = \beta_{m,B} A L_{m,B}^{-\gamma}$ $h_{k,B} = \beta_{k,B} A L_{k,B}^{-\gamma}$ $h_k = \beta_k A L_k^{-\gamma}$ $h_{m,k} = \beta_{m,k} A L_{m,k}^{-\gamma}$ Wherein, $\beta_{m,B}$ is shadowing fading between the $m^{th}$ CUE and the base station, $\beta_{k,B}$ is shadowing fading between the $k^{th}$ pair of DUE and the base station, $\beta_k$ is shadowing fading between the $k^{th}$ pair of DUE, $\beta_{m,k}$ is shadowing fading between the $m^{th}$ CUE and the $k^{th}$ pair of DUE, $L_{m,B}$ is a distance between the $m^{th}$ CUE and the base station, $L_{k,B}$ is a distance between the $k^{th}$ pair of DUE and the base station, $L_k$ is a distance between the $k^{th}$ pair of DUE, $L_k$ is proportional to vehicle speed $v$, $L_{m,k}$ is a distance between the $m^{th}$ CUE and the $k^{th}$ pair of DUE, $\gamma$ is an attenuation factor, and $A$ is a path loss constant.

The benefits are:

$$v_m(s_m, p_m, p_k, \rho_{m,k}) = s_m \left( \beta_t \frac{t_m^{loc} - t_m^{off}}{t_m^{loc}} + \beta_e \frac{e_m^{loc} - e_m^{off}}{e_m^{loc}} \right)$$

Wherein, $s_m$ represents a task offloading strategy, $s_m=0$ represents local task computing, $s_m=1$ represents offloading the task to the edge computing server for computing, $\beta_t$ and $\beta_e$ are trade-off coefficients of time delay and energy consumption respectively, and $t_m^{loc}$ and $e_m^{loc}$ represent the time delay and energy consumption of local task computing respectively:

$$t_m^{loc} = \frac{C_m}{f_m^l}$$

$e_m^{loc} = \varepsilon C_m$

Wherein, $C_m$ is a number of CPU cycles of the task, $f_m^l$ is a local CPU computing rate, and $\varepsilon$ is energy consumption per unit of CPU cycles.

$t_m^{off}$ and $e_m^{off}$ respectively represent time delay and energy consumption of offloading the task to the edge computing server for computing;

$t_m^{off} = t_m^{up} + t_m^{exe}$ $e_m^{off} = p_m t_m^{up}$

Wherein, $t_m^{up}$ and $t_m^{exe}$ are respectively task uploading time delay and edge computing server execution time delay;

$$t_m^{up} = \frac{D_m}{r_m}$$

$$t_m^{exe} = \frac{C_m}{f_m}$$

Wherein, $D_m$ is the data size of the task, $f_m$ is a computing resource allocated by the edge computing server to the $m^{th}$ CUE, and $r_m$ is the task uploading rate:

$$r_m = \frac{B}{M} \log_2(1 + \gamma_m)$$

Therefore, the function of the optimization problem is expressed as:

$$\max v_m(s_m, p_m, p_k, \rho_{m,k}) = \max \sum_{m=1}^{M} s_m \left( \beta_t \frac{t_m^{loc} - t_m^{off}}{t_m^{loc}} + \beta_e \frac{e_m^{loc} - e_m^{off}}{e_m^{loc}} \right)$$

s.t. C1: $t_m \leq T_m^{max}$
C2: $Pr(t_k \geq T_k^{max}) \leq P_0$
C3: $0 \leq p_m \leq P_{max}^c$
C4: $0 \leq p_k \leq P_{max}^d$
C5: $\Sigma_{m \in M} \rho_{m,k} \leq 1$
C6: $\Sigma_{k \in K} \rho_{m,k} \leq 1$
C7: $s_m \in \{0,1\}$
C8: $\Sigma_{m \in M} s_m C_m \leq F$ The benefit $v_m(s_m, p_m, p_k, \rho_{m,k})$ is normalized according to the time delay and energy consumption, and the maximization of $v_m(s_m, p_m, p_k, \rho_{m,k})$ is equivalent to minimization of the time delay and energy consumption.

Condition C1 indicates the maximum time delay limit of the $m^{th}$ CUE, wherein $T_m^{max}$ is the maximum time delay allowable to the $m^{th}$ CUE and $t_m$ is an actual execution time delay of the $m^{th}$ CUE as follows:

$t_m = s_m t_m^{off} + (1 - s_m) t_m^{loc}$

Condition C2 indicates the reliability guarantee of D2D communication for the $k^{th}$ pair of DUE, $T_k^{max}$ is the maximum time delay allowable to the $k^{th}$ pair of DUE, $p_0$ is the reliability guarantee probability of D2D communication, $Pr(t_k \geq T_k^{max})$ is the probability that $t_k$ is larger than or equal to $T_k^{max}$, and $t_k$ is transmission delay of the $k^{th}$ pair of DUE as follows:

$$t_k = \frac{D_k}{r_k}$$

Wherein, $D_k$ represents a task transmission size of the $k^{th}$ pair of DUE, and $r_k$ represents a transmission speed of the $k^{th}$ pair of DUE as follows:

$$r_k = \frac{B}{M}\log_2(1+\gamma_k)$$

Conditions C3 and C4 indicate the maximum power limits of the $m^{th}$ CUE and the $k^{th}$ pair of DUE, and $P_{max}{}^c$ and $P_{max}{}^d$ are respectively the maximum transmission powers of the $m^{th}$ CUE and the $k^{th}$ pair of DUE.

Condition C5 indicates that a pair of DUE may multiplex a channel of one CUE at most.

Condition C6 indicates that the channel of one CUE may be multiplexed by one pair of DUE at most.

Condition C7 indicates that a task offloading strategy variable $s_m$ is an integer of 0 or 1.

Condition C8 indicates the maximum computing resource limit of the edge computing server, and F is a number of the maximum CPU cycles that the edge computing server is capable of.

Further, in Step 2, and in the benefit $v_m(s_m, p_m, P_k, \rho_{m,k})$, a sub-optimization problem of the transmission power and channel resource allocation mode is independent from that of the task offloading strategy, thereby the optimization problem is decomposed into two sub-optimization ones: one for the transmission power and channel resource allocation mode, and the other one for the task offloading strategy.

Further, in Step 3, it is assumed that the $k^{th}$ pair of DUE multiplexes the channel of the $m^{th}$ CUE, and according to the known D2D time delay reliability limit condition and the maximum transmission power limit conditions of CUE and DUE, feasible regions of powers are obtained, and then a linear programming is used for obtaining the optimal transmission powers of CUE and DUE.

Further, in Step 4, CUE and DUE may multiplex channels randomly, the sub-optimization problem of channel resource allocation mode has turned into a maximum weight matching problem in bipartite, and the Hungarian method is used to obtain the optimal channel resource allocation mode.

Further, in Step 5, the optimization problem is transformed into a knapsack problem about the task offloading strategy, and the optimal task offloading strategy is obtained through dynamic programming.

In comparison to the prior art, the present disclosure has the following advantages and effects:

(1) The present disclosure satisfies the minimization of the time delay and energy consumption of all CUE nodes across the IoV system by fully utilizing channel resources and computing resources of the edge computing server.

(2) The present disclosure satisfies time delay limit conditions of all DUE nodes across the IoV system, and thus ensures the reliability of D2D communication.

(3) Compared with algorithms such as the local search for solving the task offloading strategy, the method based on optimization problem decomposition brings lower time complexity, while guarantees that the resultant solution is close to the global optimum.

DETAILED DESCRIPTION

So that the above mentioned purposes, technical schemes and advantages in embodiments of the present disclosure can be more apparently understood, the technical schemes in the embodiments of the present disclosure will be described clearly and completely with reference to the accompanying drawings thereof. Apparently, the embodiments described herein are part of, not all of, embodiments in the present disclosure. Based on the embodiments of the present disclosure, all other embodiments obtained by those of ordinary skills in the art without creative work belong to the scope claimed by the present disclosure.

Embodiments

Figure 1:
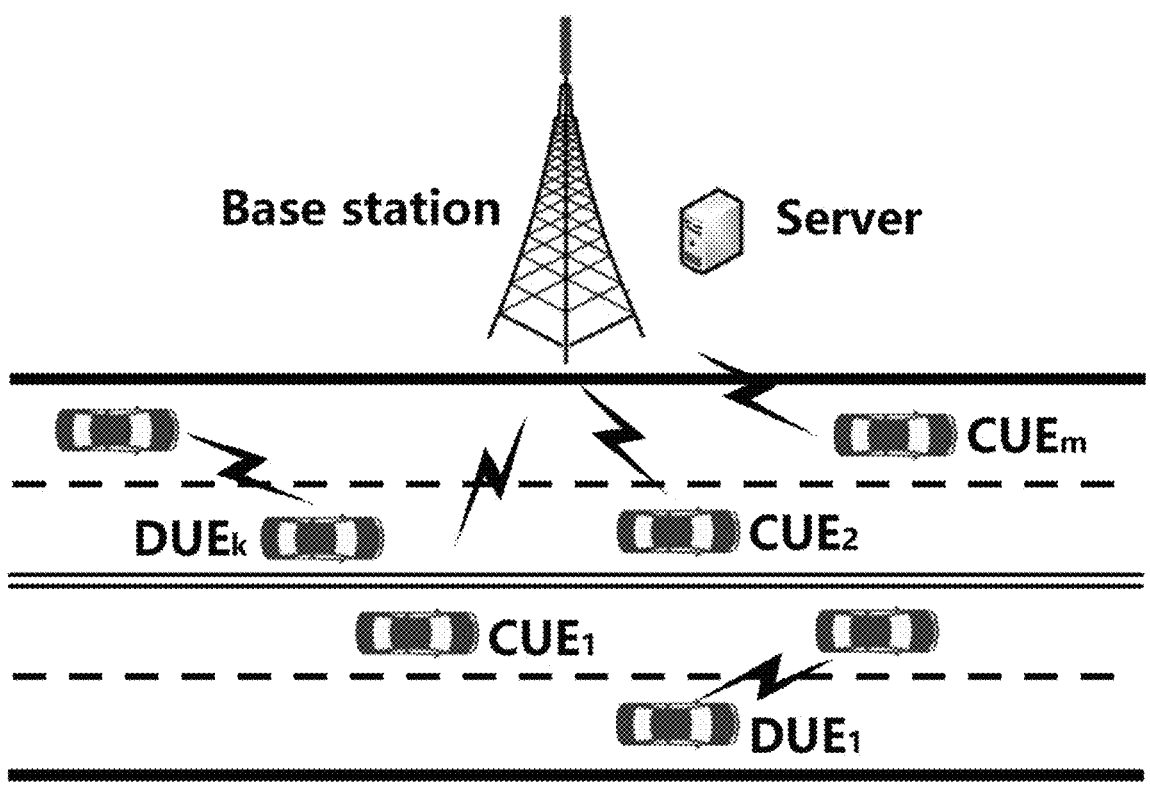
FIG. 1 is a physical structure diagram of the IoV system according to an embodiment of the present disclosure.

As shown in FIG. 1, the method applies to a single base station deployed along the road, wherein an edge computing server is deployed near the single base station, the base station adopts an OFDMA access mode and has a certain number of CUE and DUE in its coverage area; CUE may communicate with the base station; task requests generated by CUE may choose to be executed at the local of CUE or the edge computing server; the local data exchange is performed between DUE in the form of D2D; DUE multiplexes CUE channels, thus causing communication interference between CUE and DUE.

Figure 2:
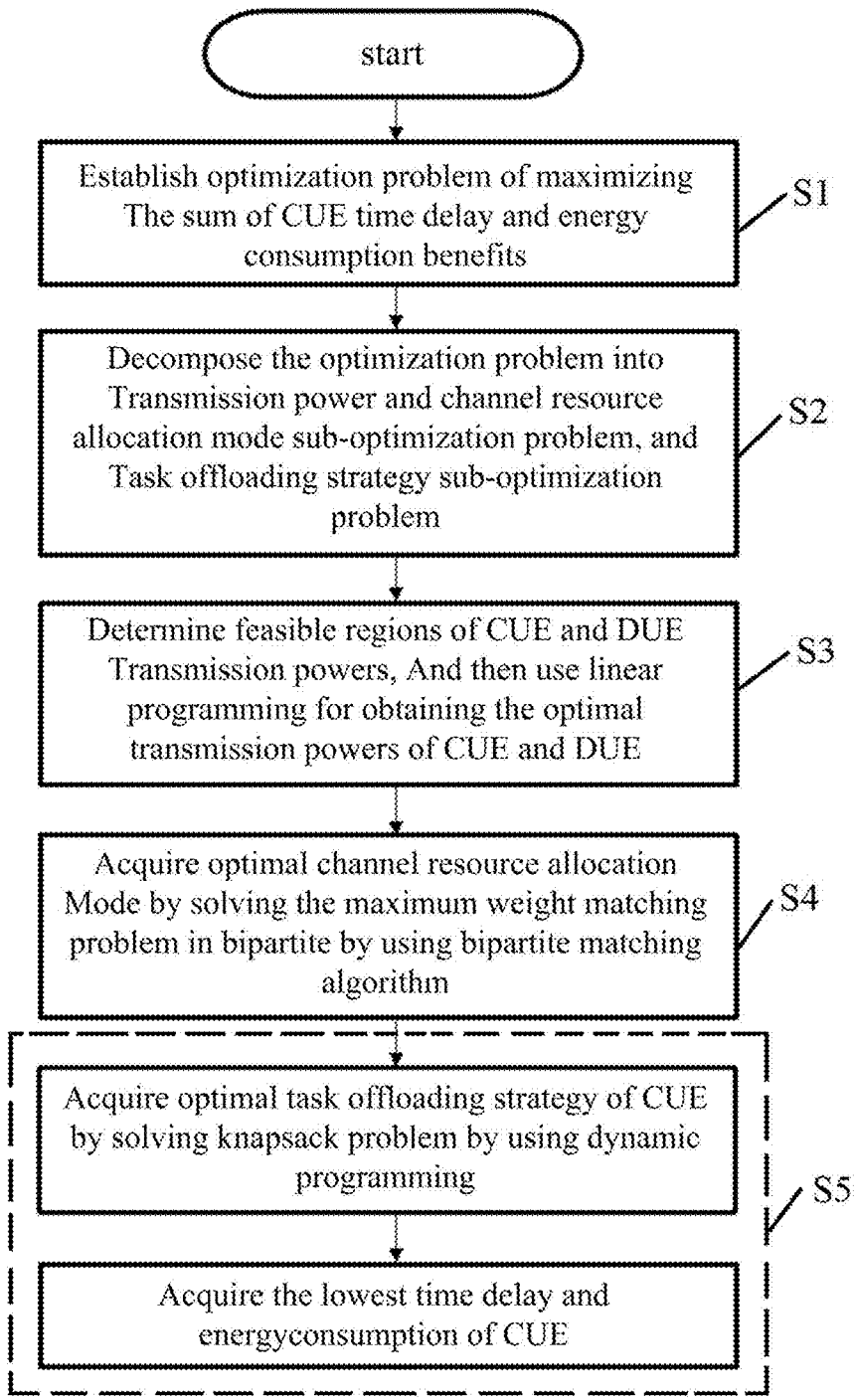
FIG. 2 is a flowchart of a method of multi-access edge computing task offloading based on D2D in IoV environment disclosed in embodiments of the present disclosure.

FIG. 2 shows a flowchart of the entire method of multi-access edge computing task offloading. In this embodiment, the method of multi-access edge computing task offloading based on D2D in IoV environment specifically includes the following steps:

In Step 1, an optimization problem is modeled as a problem of maximizing the sum of time delay and energy consumption benefit, wherein the benefit is defined as a ratio of a difference between the local execution cost and the actual execution cost to the local execution cost, the cost herein represents the time delay or energy consumption, and the optimization problem is equivalent to the problem of minimizing the sum of time delay and energy consumption.

In the application of this field, traditional methods directly regard the minimization of the sum of time delay and energy consumption as an optimization problem. Due to the difference in unit between time delay and energy consumption, either time delay is minimized while energy consumption is not yet, or energy consumption is minimized while time delay is not yet. Therefore, in this embodiment, the maximization of the sum of time delay and energy consumption benefits is regarded as an optimization problem, wherein the benefits are normalized according to time delay and energy consumption so as to minimize both time delay and energy consumption at the same time and to set different preferences for both time delay and energy consumption. For example, when a terminal needs energy saving, its preference for energy consumption may be increased and its preference for time delay may be reduced; and when the terminal needs lower time delay, its preference for time delay may be increased and its preference for energy consumption may be reduced.

The process of Step 1 is as follows:

It is assumed that the number of CUE is M, m represents the $m^{th}$ CUE, the number of DUE is K pairs, and k represents the $k^{th}$ pair of DUE. Since the channel is less used, it facilitates the management of the base station interference. In order to improve the spectrum usage efficiency, the channel allocated for CUE is multiplexed by DUE, and a total bandwidth of the base station is B.

Signal-to-noise ratios of the $m^{th}$ CUE and the $k^{th}$ pair of DUE received by the base station are respectively:

$$\gamma_m = \frac{p_m h_{m,B}}{\sigma^2 + \sum_{k \in K} \rho_{m,k} p_k h_{k,B}}$$

and $$\gamma_k = \frac{p_k h_k}{\sigma^2 + \sum_{m \in M} \rho_{m,k} p_m h_{m,k}}$$

Wherein $p_m$ and $p_k$ represent transmission powers of the $m^{th}$ CUE and $k^{th}$ pair of DUE respectively, $h_{m,B}$ is a channel gain between the $m^{th}$ CUE and the base station, $h_{k,B}$ is a channel gain between the $k^{th}$ pair of DUE and the base station, $h_k$ is a channel gain between the $k^{th}$ pair of DUE, $h_{m,k}$ is a channel gain between the $m^{th}$ CUE and the $k^{th}$ pair of DUE, $\sigma^2$ is a noise power, $\rho_{m,k}$ is a channel resource allocation mode, $\rho_{m,k}=1$ indicates that the $k^{th}$ pair of DUE multiplexes the channel of the $m^{th}$ CUE, or otherwise $\rho_{m,k}=0$ indicates that the $k^{th}$ pair of DUE does not multiplex the channel of the $m^{th}$ CUE.

In the above formulas, the channel gains only take into consideration large-scale gains which include:

$h_{m,B} = \beta_{m,B} A L_{m,B}^{-\gamma}$ $h_{k,B} = \beta_{k,B} A L_{k,B}^{-\gamma}$ $h_k = \beta_k A L_k^{-\gamma}$ $h_{m,k} = \beta_{m,k} A L_{m,k}^{-\gamma}$ Wherein, $\beta_{m,B}$ is shadowing fading between the $m^{th}$ CUE and the base station, $\beta_{k,B}$ is shadowing fading between the $k^{th}$ pair of DUE and the base station, $\beta_k$ is shadowing fading between the $k^{th}$ pair of DUE, $\beta_{m,k}$ is shadowing fading between the $m^{th}$ CUE and the $k^{th}$ pair of DUE, $L_{m,B}$ is a distance between the $m^{th}$ CUE and the base station, $L_{k,B}$ is a distance between the $k^{th}$ pair of DUE and the base station, $L_k$ is a distance between the $k^{th}$ pair of DUE, $L_k$ is proportional to vehicle speed v, $L_{m,k}$ is a distance between the $m^{th}$ CUE and the $k^{th}$ pair of DUE, $\gamma$ is an attenuation factor, and A is a path loss constant.

The benefits are:

$$v_m(s_m, p_m, p_k, \rho_{m,k}) = s_m \left( \beta_t \frac{t_m^{loc} - t_m^{off}}{t_m^{loc}} + \beta_e \frac{e_m^{loc} - e_m^{off}}{e_m^{loc}} \right)$$

Wherein, $s_m$ represents a task offloading strategy, $s_m=0$ represents local task computing, $s_m=1$ represents offloading the task to the edge computing server for computing, $\beta_t$ and $\beta_e$ are trade-off coefficients of time delay and energy consumption respectively, and $t_m^{loc}$ and $e_m^{loc}$ represent the time delay and energy consumption of local task computing respectively:

$$t_m^{loc} = \frac{C_m}{f_m^l}$$

$$e_m^{loc} = \varepsilon C_m$$

Wherein, $C_m$ is a number of CPU cycles of the task, $f_m^l$ is a local CPU computing rate, and $\varepsilon$ is energy consumption per unit of CPU cycles.

$t_m^{off}$ and $e_m^{off}$ respectively represent time delay and energy consumption of offloading the task to the edge computing server for computing;

$t_m^{off} = t_m^{up} + t_m^{exe}$ $e_m^{off} = p_m t_m^{up}$

Wherein, $t_m^{up}$ and $t_m^{exe}$ are respectively task uploading time delay and edge computing server execution time delay;

$$t_m^{up} = \frac{D_m}{r_m}$$

$$t_m^{exe} = \frac{C_m}{f_m}$$

Wherein, $D_m$ is the data size of the task, $f_m$ is a computing resource allocated by the edge computing server to the $m^{th}$ CUE, and $r_m$ is the task uploading rate:

$$r_m = \frac{B}{M} \log_2(1 + \gamma_m)$$

Therefore, the function of the optimization problem is expressed as:

$$\max v_m(s_m, p_m, p_k, \rho_{m,k}) = \max \sum_{m=1}^{M} s_m \left( \beta_t \frac{t_m^{loc} - t_m^{off}}{t_m^{loc}} + \beta_e \frac{e_m^{loc} - e_m^{off}}{e_m^{loc}} \right)$$

s.t. C1: $t_m \leq T_m^{max}$
C2: $Pr(t_k \geq T_k^{max}) \leq P_0$

C3: $0 \leq p_m \leq P_{max}^c$
C4: $0 \leq p_k \leq P_{max}^d$
C5: $\Sigma_{m \in M} \rho_{m,k} \leq 1$
C6: $\Sigma_{k \in K} \rho_{m,k} \leq 1$
C7: $s_m \in \{0,1\}$
C8: $\Sigma_{m \in M} s_m C_m \leq F$ The benefit $v_m(s_m, p_m, p_k, \rho_{m,k})$ is normalized according to the time delay and energy consumption, and the maximization of $v_m(s_m, p_m, p_k, \rho_{m,k})$ is equivalent to minimization of the time delay and energy consumption.

Condition C1 indicates the maximum time delay limit of the $m^{th}$ CUE, wherein $T_m^{max}$ is the maximum time delay allowable to the $m^{th}$ CUE and $t_m$ is an actual execution time delay of the $m^{th}$ CUE as follows:

$$t_m = s_m t_m^{off} + (1-s_m) t_m^{loc}$$

Condition C2 indicates the reliability guarantee of D2D communication for the $k^{th}$ pair of DUE, $T_k^{max}$ is the maximum time delay allowable to the $k^{th}$ pair of DUE, $p_0$ is the reliability guarantee probability of D2D communication, $Pr(t_k \geq T_k^{max})$ is the probability that $t_k$ is larger than or equal to and $T_k^{max}$ is transmission delay of the $k^{th}$ pair of DUE as follows:

$$t_k = \frac{D_k}{r_k}$$

Wherein, $D_k$ represents a task transmission size of the $k^{th}$ pair of DUE, and $r_k$ represents a transmission speed of the $k^{th}$ pair of DUE as follows:

$$r_k = \frac{B}{M} \log_2(1 + \gamma_k)$$

Conditions C3 and C4 indicate the maximum power limits of the $m^{th}$ CUE and the $k^{th}$ pair of DUE, and $P_{max}^c$ and $P_{max}^d$ are respectively the maximum transmission powers of the $m^{th}$ CUE and the $k^{th}$ pair of DUE.

Condition C5 indicates that a pair of DUE may multiplex a channel of one CUE at most.

Condition C6 indicates that the channel of one CUE may be multiplexed by one pair of DUE at most.

Condition C7 indicates that a task offloading strategy variable $s_m$ is an integer of 0 or 1.

Condition C8 indicates the maximum computing resource limit of the edge computing server, and F is a number of the maximum CPU cycles that the edge computing server is capable of.

In Step 2, the optimization problem is decomposed.

In the application of traditional methods in this field, heuristic algorithms that are quite high in time complexity are directly adopted for the minimization of time delay and energy consumption. Therefore, in an embodiment, this method takes full advantage of a feature that a sub-optimization problem of the task offloading strategy is independent from that of the transmission power and channel resource allocation mode, in order to decompose the optimization problem into two sub-optimization ones: one for the task offloading strategy, and the other one for the transmission power and channel resource allocation mode, thereby reducing the time complexity.

The process of Step 2 is as follows:

The sub-optimization problem of the task offloading strategy is independent from that of the transmission power and channel resource allocation mode. The task offloading strategy and channel resource allocation mode refer to an integer variable, the transmission power is a continuous variable, and the optimization problem is a mixed integer nonlinear programming problem.

In order to solve optimization problem, the optimization problem is decomposed into two independent sub-optimization problems: one for the task offloading strategy, and the other one for the transmission power and channel resource allocation mode. As a result, the optimization problem turns into:

$$\max_{s^v} \max_{\rho_{m,k}, p_m, p_k} \sum_{m \in S} v_m(s_m, \rho_{m,k}, p_m, p_k)$$

s.t. C1: $t_m \leq T_m^{max}$
C2: $Pr(t_k \geq T_k^{max}) \leq P_0$
C3: $0 \leq p_m \leq P_{max}^c$
C4: $0 \leq p_k \leq P_{max}^d$
C5: $\Sigma_{m \in M} \rho_{m,k} \leq 1$
C6: $\Sigma_{k \in K} \rho_{m,k} \leq 1$
C7: $s_m \in \{0,1\}$
C8: $\Sigma_{m \in M} s_m C_m \leq F$ Wherein $s^v$ is a task offloading strategy vector, S is a set of CUE choosing task offloading, and $S = \{m | s_m = 1\}$.

The optimization problem is decomposed into two independent sub-optimization problems, which is expressed as follows:

$$\max_{s^v} r(S)$$

Wherein, under the set of CUE-specific task offloading strategies S, r(S) is a sub-optimization problem about the transmission power and channel resource allocation mode as follows:

$$\max_{\rho_{m,k}, p_m, p_k} \sum_{m \in S} v_m(s_m, \rho_{m,k}, p_m, p_k)$$

s.t. C2: $Pr(t_k \geq T_k^{max}) \leq P_0$
C3: $0 \leq p_m \leq P_{max}^c$
C4: $0 \leq p_k \leq P_{max}^d$
C5: $\Sigma_{m \in M} \rho_{m,k} \leq 1$
C6: $\Sigma_{k \in K} \rho_{m,k} \leq 1$ Wherein r(S) has an optimal solution r*(S), and then the optimization problem is transformed into a sub-optimization problem about the task offloading strategy $s_m$ as follows:

$$\max_{s^v} r^*(S)$$

By substituting the time delays and energy consumptions of the local execution and the edge execution into benefits, the sub-optimization problem r(S) of transmission power and channel resource allocation mode will be:

$$\max_{\rho_{m,k}, p_m, p_k} \left\{ \sum_{m \in S} (\beta_T + \beta_E) - \sum_{m \in S} \left( \beta_T \frac{t_m^{off}}{t_m^{loc}} + \beta_E \frac{e_m^{off}}{e_m^{loc}} \right) \right\}$$

Wherein $\Sigma_{m\in S}(\beta_T+\beta_E)$ is constant, and therefore r(S) is equivalent to:

$$\min_{\rho_{m,k},p_m,p_k} \sum_{m\in S}\left(\beta_T \frac{t_m^{off}}{t_m^{loc}} + \beta_E \frac{e_m^{off}}{e_m^{loc}}\right)$$

In Step 3, an optimal transmission power of CUE and DUE are computed, wherein according to the known D2D time delay reliability limit condition and power limit conditions of CUE and DUE, feasible regions of CUE and DUE powers are determined, and then a linear programming is used for obtaining the optimal transmission powers of CUE and DUE;

The process of Step 3 is as follows:

Assuming that the $k^{th}$ pair of DUE multiplexes a channel of the $m^{th}$ CUE, for this CUE-DUE multiplexing pair, the sub-optimization problem r(S) of transmission power and channel resource allocation mode is simplified as follows:

$$\min_{p_m,p_k}\left(\beta_T \frac{t_m^{off}}{t_m^{loc}} + \beta_E \frac{e_m^{off}}{e_m^{loc}}\right)$$

s.t. C2: $\Pr(t_k \geq T_k^{max}) \leq P_0$
C3: $0 \leq p_m \leq P_{max}^c$
C4: $0 \leq p_k \leq P_{max}^d$ According to the reliability limit condition C2, a limit condition satisfied by the CUE and DUE transmission powers may be obtained as follows:

$$p_m \leq \frac{h_k p_k}{\gamma_0^d h_{m,k}}\left(\frac{e^{\frac{\gamma_0^d \sigma^2}{h_k p_k}}}{1-P_0} - 1\right)$$

Wherein $\gamma_0^d$ is a threshold of signal-to-noise ratio, and $\gamma_0^d$ is acquired according to the maximum time delay allowable to DUE for the D2D communication.

By combining the above limit conditions satisfied by CUE and DUE transmission powers with C3 and C4 conditions, feasible regions of powers can be obtained, and the optimal transmission power of CUE $p^*_m$ and the optimal transmission power of DUE $p^*_k$ may be obtained by using linear programming to solve the sub-optimization problem of transmission power.

In Step 4, an optimal channel resource allocation mode is computed, wherein the optimal channel resource allocation mode is acquired by solving a problem of maximum weight matching in bipartite by using a bipartite matching algorithm;

The process of Step 4 is as follows:

According to the optimal transmission power of CUE $p^*_m$ and the optimal transmission power of DUE $p^*_k$, the sub-optimization problem r(S) of transmission power and channel resource allocation mode is transformed into:

$$\max_{\rho_{m,k}} \sum_{m\in S}\sum_{k\in K} \rho_{m,k} v_m^*(s_m, \rho_{m,k}, p_m, p_k)$$

s.t. C5: $t_m \leq T_m^{max}$
C6: $\Sigma_{k\in K} \rho_{m,k} \leq 1$

Wherein $V^*_m(s_m, \rho_{m,k}, p_m, P_k)$ is the optimal benefit that is computed according to the optimal transmission power $p^*_m$ of CUE and the optimal transmission power $p^*_k$ of DUE in the case of assuming that the $k^{th}$ pair of DUE multiplexes the channel of the $m^{th}$ CUE.

The sub-optimization problem r(S) of transmission power and channel resource allocation mode is a maximum weight matching problem in bipartite, and the Hungarian algorithm is used for solution to obtain the optimal channel resource allocation mode $\rho^*_{m,k}$.

In Step 5, an optimal task offloading strategy is computed, wherein the optimal task offloading strategy of CUE is acquired by solving a knapsack problem by using dynamic programming.

The process of Step 5 is as follows:

According to the optimal transmission power of CUE $p^*_m$ and the optimal transmission power of DUE $p^*_k$, as well as the optimal channel resource allocation mode $\rho^*_{m,k}$, the optimization problem is transformed into a sub-optimization problem about the task offloading strategy:

$$\max \sum_{m=1}^{M} s_m r^*(S)$$

s.t. C7: $s_m \in \{0,1\}$
C8: $\Sigma_{m\in M} s_m C_m \leq F$

The above sub-optimization problem of task offloading strategy is a typical knapsack problem, and the optimal task offloading strategy $s^*_m$ is obtained by solving the dynamic programming.

TABLE 1

Simulation Parameter Setting Table

| | |
|---|---|
| B | 20 MHz |
| $f_m^l$ | 1-1.5 GHz |
| $P_0$ | 0.0001 |
| K | 20 |
| M | 20 |
| $N_0$ | −414 dbm |
| $P_{max}^c$ | 17 dbm, 23 dbm |
| $P_{max}^d$ | 17 dbm, 23 dbm |
| v | 60-140 km/h |
| Channel model | 3GPP TR 36.885 |

Figure 3:
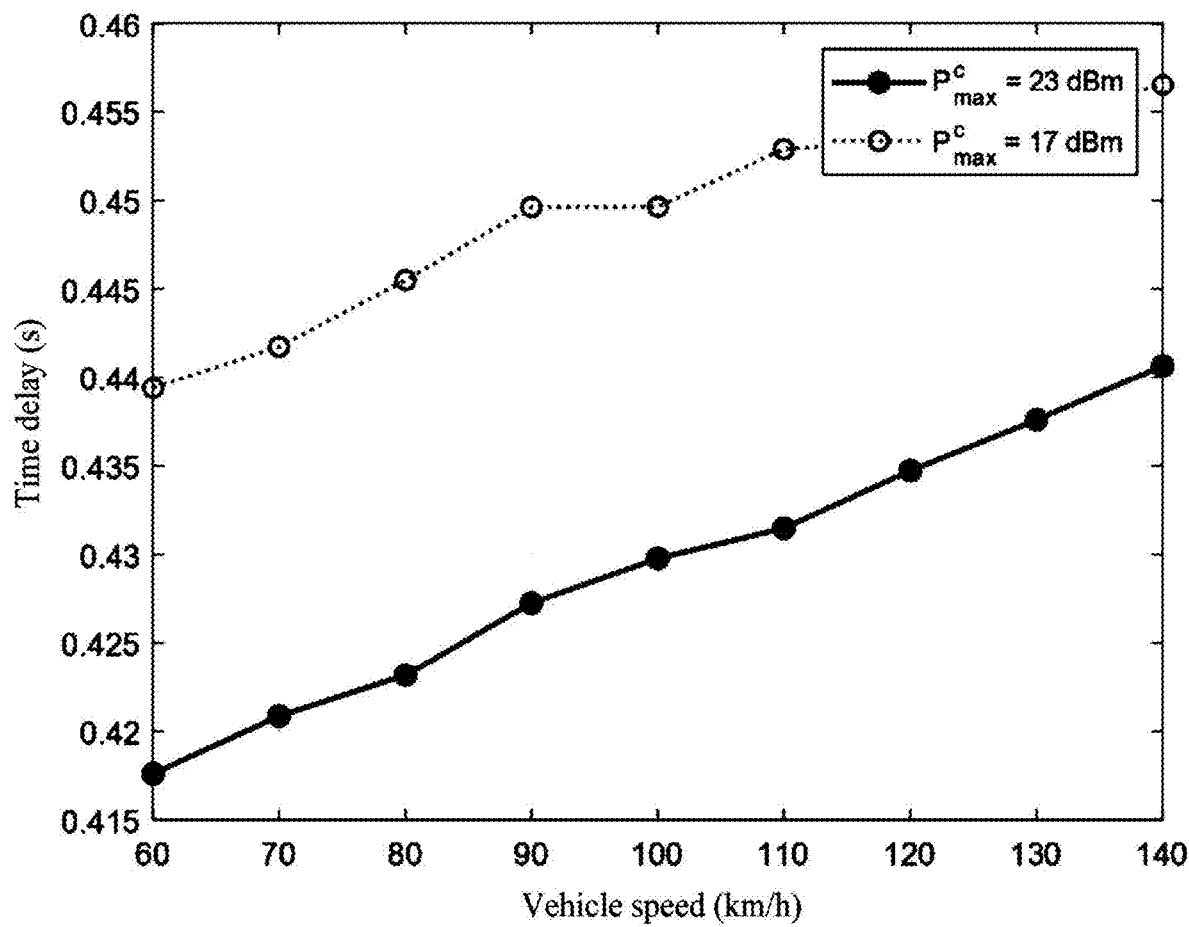
FIG. 3 is a schematic diagram of the relationship among the average CUE time delay, the vehicle speed, and the maximum CUE transmission power according to an embodiment of the present disclosure.

FIG. 3 shows the relationship between the average CUE time delay and the CUE vehicle speed when the maximum CUE transmission power is 23 dbm and 17 dbm respectively. It can be seen from FIG. 3 that as the CUE vehicle speed increases, the average CUE time delay also increases. The larger the maximum CUE transmission power is, the less the average CUE time delay would be.

Figure 4:
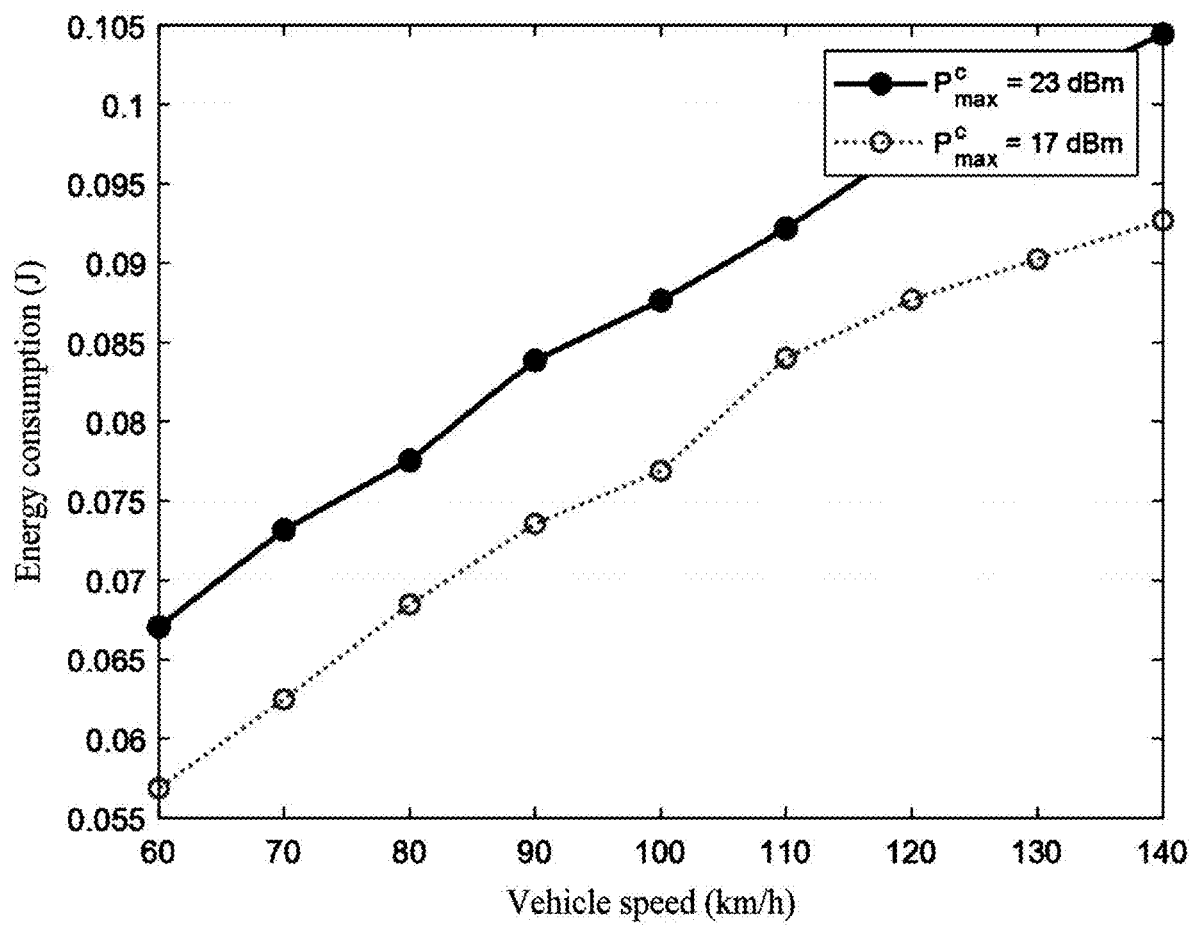
FIG. 4 is a schematic diagram of the relationship among the average CUE energy consumption, the vehicle speed, and the maximum CUE transmission power according to an embodiment of the present disclosure.

FIG. 4 shows the relationship between the average CUE energy consumption and the CUE vehicle speed when the maximum CUE transmission power is 23 dbm and 17 dbm respectively. It can be seen from FIG. 4 that as the CUE vehicle speed increases, the average CUE energy consumption also increases. The increase of the maximum CUE transmission power decreases the average CUE time delay while increases the average CUE energy consumption.

Figure 5:
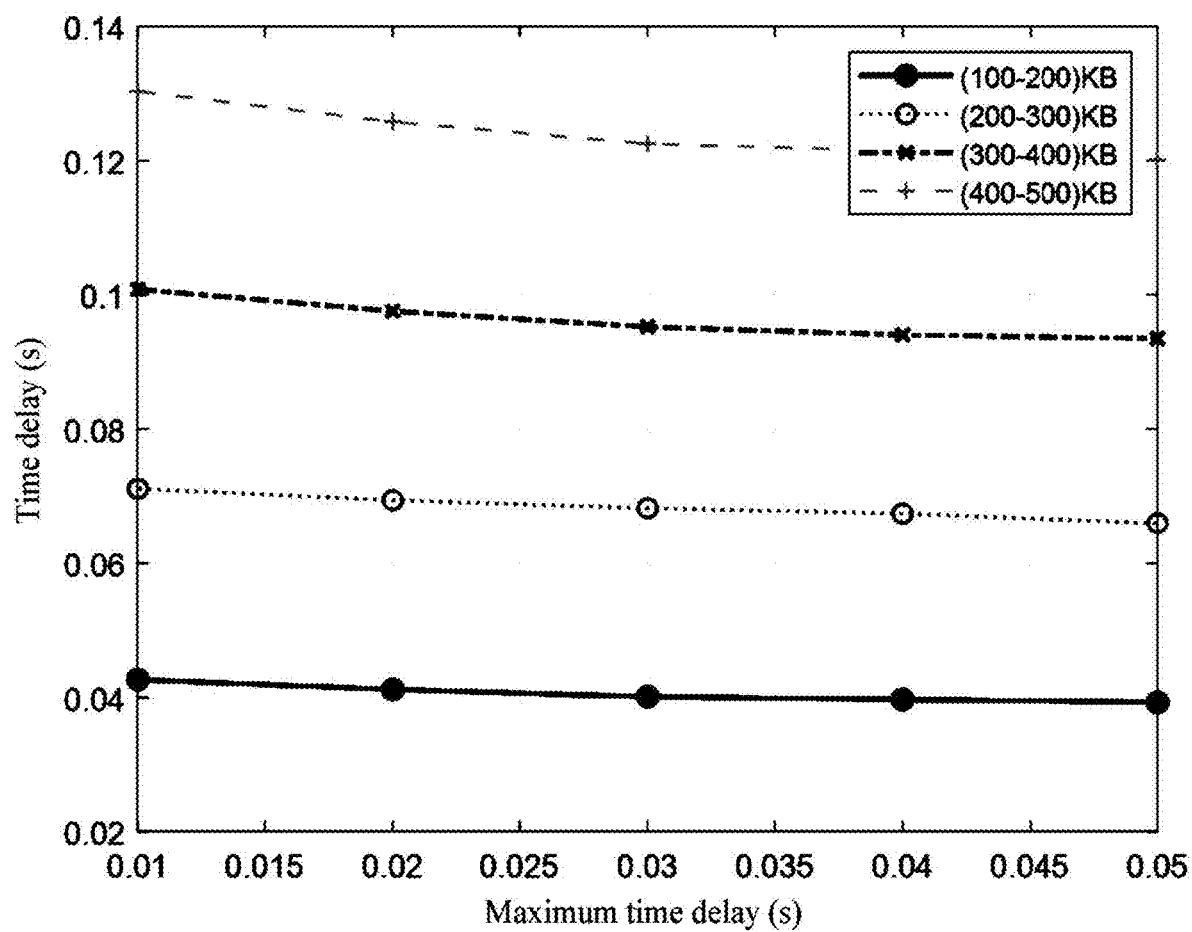
FIG. 5 is a schematic diagram of the relationship among the average CUE time delay, the maximum DUE time delay, and the task load according to an embodiment of the present disclosure.

FIG. 5 shows the relationship between the average CUE time delay and the maximum time delay allowable to DUE when task loads of CUE are (100-200)KB, (200-300)KB, (300-400)KB and (400-500)KB respectively. It can be seen from FIG. 5 that the larger the maximum time delay allowable to DUE is, the less the average CUE time delay would be; and at the same time, the smaller the CUE task load is, the less the average CUE time delay would be.

Figure 6:
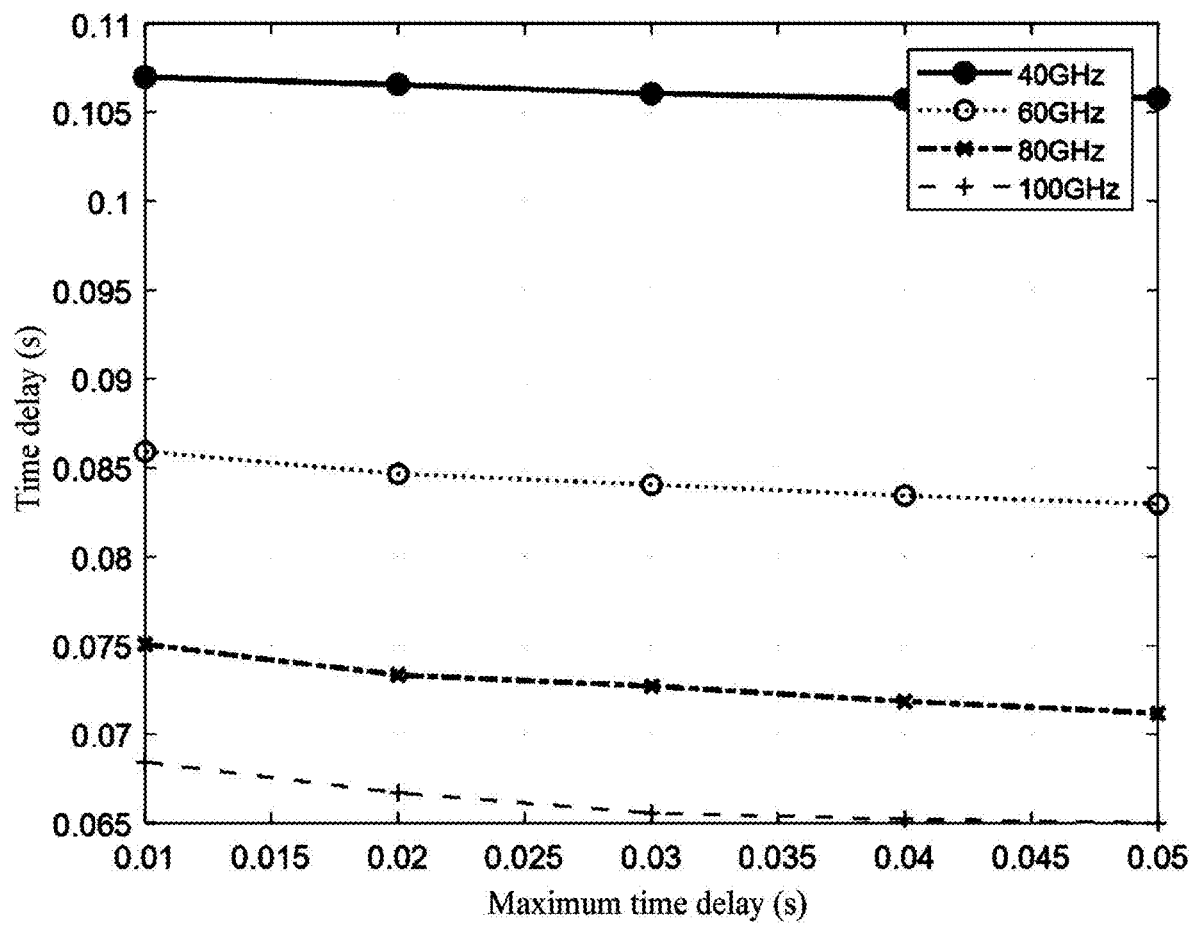
FIG. 6 is a schematic diagram of the relationship among the average CUE time delay, the maximum DUE time delay, and the computing rate of the base station according to an embodiment of the present disclosure.

FIG. 6 shows the relationship between the average CUE time delay and the maximum DUE time delay when the computing rate of the base station is 40 G/s, 60 G/s, 80 G/s and 100 G/s. The larger the computing rate of the base station is, the less the average CUE time delay would be.

Figure 7:
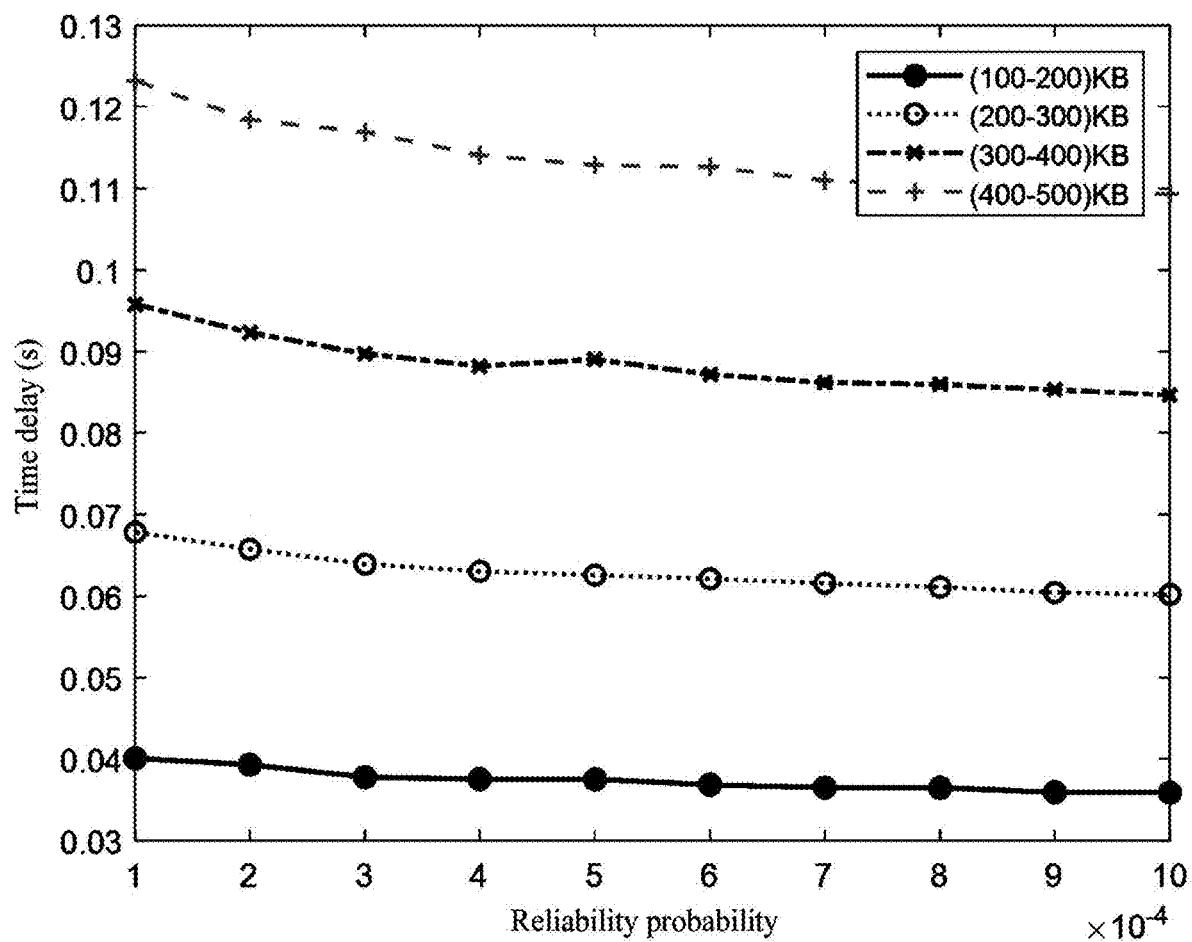
FIG. 7 is a schematic diagram of the relationship among the average CUE time delay, the DUE reliability probability, and the task load according to an embodiment of the present disclosure.

FIG. 7 shows the relationship between the average CUE time delay and the DUE reliability probability when task loads of CUE are (100-200)KB, (200-300)KB, (300-400) KB and (400-500)KB respectively. It can be seen from FIG. 7 that the higher the DUE reliability probability is, the less the average CUE time delay would be; and at the same time, as the CUE task load decreases, the average CUE time delay would decreases as well.

Figure 8:
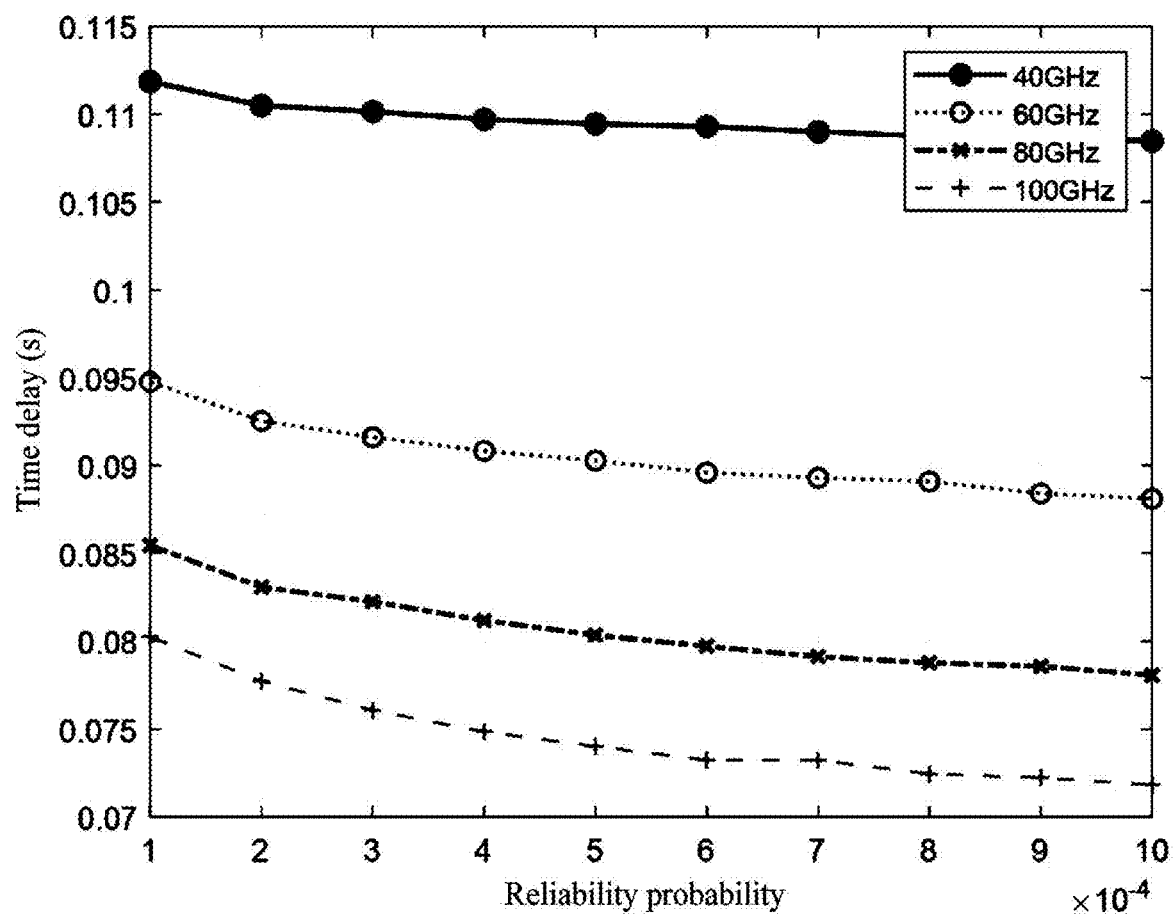
FIG. 8 is a schematic diagram of the relationship among the average CUE time delay, the DUE reliability probability, and the computing rate of the base station according to an embodiment of the present disclosure.

FIG. 8 shows the relationship between the average CUE time delay and the DUE reliability probability when the computing rate of the base station is 40 G/s, 60 G/s, 80 G/s and 100 G/s. It can be seen from FIG. 8 that the larger the computing rate of the base station is, the less the average CUE time delay would be.

Embodiments described above are preferred embodiments of the present disclosure, but implementations of the present disclosure are not limited to the above embodiments. Any other changes, modifications, substitutions, combinations and simplifications made without departing from the spirit and principle of the present disclosure shall be equivalent alternations and fall within the protection scope claimed by the present disclosure.

What is claimed is:

1. A method of multi-access edge computing task offloading based on D2D in Internet Of Vehicle (IoV) environment, which applies to an edge computing server deployed near a single base station, wherein the base station adopts an OFDMA access mode and has a certain number of cellular users (CUEs) and D2D users (DUEs) in its coverage area; the CUEs communicates with the base station; local data exchange is performed between the DUEs in the form of D2D; and the DUEs multiplex CUE channels, causing communication interference between the CUEs and the DUEs;

wherein, the method comprises:

receiving, task requests generated by the CUEs, from the CUEs and performing operations, by the edge computing server, comprising:

S1, modeling an optimization problem of maximizing the sum of time delay and energy consumption benefit, wherein the benefit is defined as a ratio of a difference between the local execution cost and the actual execution cost to the local execution cost, the cost represents the time delay or energy consumption, and the optimization problem is equivalent to the problem of minimizing the sum of time delay and energy consumption;

S2, decomposing the optimization problem into two sub-optimization problems comprising a sub-optimization problem of a task offloading strategy, and a sub-optimization problem of transmission power and a channel resource allocation mode; and wherein the sub-optimization problem of the task offloading strategy is independent from that of the transmission power and channel resource allocation mode;

S3, determining feasible regions of CUE and DUE powers based on a known D2D time delay reliability limit condition and power limit conditions of the CUEs and the DUEs, and computing optimal transmission powers of the CUEs and the DUEs using a linear programming;

S4, computing an optimal channel resource allocation mode by using a bipartite matching algorithm to solve a problem of maximum weight matching in bipartite; and S5, computing optimal task offloading strategies of the CUEs by using dynamic programming to solve a knapsack problem; and S6, transmitting the optimal task offloading strategies to corresponding CUEs;

receiving, by the CUEs, their respective optimal task offloading strategies, from the edge computing server; and executing the task generated by the CUEs by the corresponding CUEs, or offloading the task generated by the CUEs to the edge computing server by the corresponding CUEs, based on their respective optimal task offloading strategies.

2. The method of multi-access edge computing task offloading based on D2D in IoV environment according to claim 1, wherein in S1, signal-to-noise ratios of the $m^{th}$ CUE and the $k^{th}$ pair of DUEs received by the base station are respectively:

$$\gamma_m = \frac{p_m h_{m,B}}{\sigma^2 + \sum_{k \in K} \rho_{m,k} p_k h_{k,B}}$$

and $$\gamma_k = \frac{p_k h_k}{\sigma^2 + \sum_{m \in M} \rho_{m,k} p_m h_{m,k}}$$

wherein M is a number of the CUEs, m represents the $m^{th}$ CUE, a number of the DUEs is K pairs, and k represents the $k^{th}$ pair of DUEs; a channel allocated for the $m^{th}$ CUE is multiplexed by the $k^{th}$ pair of DUEs, and B is a total bandwidth of the base station; $p_m$ and $p_k$ represent transmission powers of the $m^{th}$ CUE and $k^{th}$ pair of DUEs respectively, $h_{m,B}$ is a channel gain between the $m^{th}$ CUE and the base station, $h_{k,B}$ is a channel gain between the $k^{th}$ pair of DUEs and the base station, $h_k$ is a channel gain between the $k^{th}$ pair of DUEs, $h_{m,k}$ is a channel gain between the $m^{th}$ CUE and the $k^{th}$ pair of DUEs, $\sigma^2$ is a noise power, $\rho_{m,k}$ is a channel resource allocation mode, $\rho_{m,k}=1$ indicates that the $k^{th}$ pair of DUEs multiplexes a channel of the $m^{th}$ CUE, and $\rho_{m,k}=0$ indicates that the $k^{th}$ pair of DUEs does not multiplex the channel of the $m^{th}$ CUE;

the channel gains only take into consideration large-scale gains which comprise:

$$h_{m,B} = \beta_{m,B} A L_{m,B}^{-\gamma}$$

$$h_{k,B} = \beta_{k,B} A L_{k,B}^{-\gamma}$$

$$h_k = \beta_k A L_k^{-\gamma}$$

$$h_{m,k} = \beta_{m,k} A L_{m,k}^{-\gamma}$$

wherein $\beta_{m,B}$ is shadowing fading between the $m^{th}$ CUE and the base station, $\beta_{k,B}$ is shadowing fading between the $k^{th}$ pair of DUEs and the base station, $\beta_k$ is shadowing fading between the $k^{th}$ pair of DUEs, $\beta_{m,k}$ is shadowing fading between the $m^{th}$ CUE and the $k^{th}$ pair of DUEs, $L_{m,B}$ is a distance between the $m^{th}$ CUE and the base station, $L_{k,B}$ is a distance between the $k^{th}$ pair of DUEs and the base station, $L_k$ is a distance between the $k^{th}$ pair of DUEs, $L_k$ is proportional to vehicle speed v, $L_{m,k}$ is a distance between the $m^{th}$ CUE and the $k^{th}$ pair of DUEs, $\gamma$ is an attenuation factor, and A is a path loss constant;

the benefits are:

$$v_m(s_m, p_m, p_k, \rho_{m,k}) = s_m\left(\beta_t \frac{t_m^{loc} - t_m^{off}}{t_m^{loc}} + \beta_e \frac{e_m^{loc} - e_m^{off}}{e_m^{loc}}\right)$$

wherein, $s_m$ represents the task offloading strategy, $s_m=0$ represents local task computing, $s_m=1$ represents offloading the task to the edge computing server for computing, $\beta_t$ and $\beta_e$ are trade-off coefficients of time delay and energy consumption respectively, and $t_m^{loc}$ and $e_m^{loc}$ represent the time delay and energy consumption of local task computing respectively:

$$t_m^{loc} = \frac{C_m}{f_m^l}$$

$$e_m^{loc} = \varepsilon E_m$$

wherein, $C_m$ is a number of CPU cycles of the task, $f_m^l$ is a local CPU computing rate, and $\varepsilon$ is energy consumption per unit of CPU cycle;

$t_m^{off}$ and $e_m^{off}$ respectively represent time delay and energy consumption of offloading the task to the edge computing server for computing;

$t_m^{off} = t_m^{up} + t_m^{exe}$ $e_m^{off} = p_m t_m^{up}$ wherein, $t_m^{up}$ and $t_m^{exe}$ are respectively task uploading time delay and edge computing server execution time delay;

$$t_m^{up} = \frac{D_m}{r_m}$$

$$t_m^{exe} = \frac{C_m}{f_m}$$

wherein, $D_m$ is a data size of the task, $f_m$ is a computing resource allocated by the edge computing server to the $m^{th}$ CUE, and $r_m$ is a task uploading rate:

$$r_m = \frac{B}{M}\log_2(1+\gamma_m); \text{ and}$$

a function of the optimization problem is expressed as:

$$\max v_m(s_m, p_m, p_k, \rho_{m,k}) = \max \sum_{m=1}^{M} s_m\left(\beta_t \frac{t_m^{loc} - t_m^{off}}{t_m^{loc}} + \beta_e \frac{e_m^{loc} - e_m^{off}}{e_m^{loc}}\right)$$

s.t. C1: $t_m \leq T_m^{max}$
C2: $Pr(t_k \geq T_k^{max}) \leq P_0$
C3: $0 \leq p_m \leq P_{max}^c$
C4: $0 \leq p_k \leq P_{max}^d$
C5: $\Sigma_{m \in M} \rho_{m,k} \leq 1$
C6: $\Sigma_{k \in K} \rho_{m,k} \leq 1$
C7: $s_m \in \{0,1\}$
C8: $\Sigma_{m \in M} s_m C_m \leq F$ wherein the benefit $v_m(s_m, p_m, p_k, \rho_{m,k})$ is normalized according to the time delay and energy consumption, and the maximization of $v_m(s_m, p_m, p_k, \rho_{m,k})$ is equivalent to minimization of the time delay and energy consumption;

condition C1 indicates the maximum time delay limit of the $m^{th}$ CUE, wherein $T_m^{max}$ is the maximum time delay allowable to the $m^{th}$ CUE and $t_m$ is an actual execution time delay of the $m^{th}$ CUE as follows:

$t_m = s_m t_m^{off} + (1-s_m)t_m^{loc}$ condition C2 indicates the reliability guarantee of D2D communication for the $k^{th}$ pair of DUEs, $T_k^{max}$ is the maximum time delay allowable to the $k^{th}$ pair of DUEs, $p_0$ is the reliability guarantee probability of D2D communication, $Pr(t_k \geq T_k^{max})$ is the probability that $t_k$ is larger than or equal to $T_k^{max}$, and $t_k$ is transmission delay of the $k^{th}$ pair of DUEs as follows:

$$t_k = \frac{D_k}{r_k}$$

wherein, $D_k$ represents a task transmission size of the $k^{th}$ pair of DUEs, and $r_k$ represents a transmission speed of the $k^{th}$ pair of DUEs as follows:

$$r_k = \frac{B}{M}\log_2(1+\gamma_k);$$

conditions C3 and C4 indicate the maximum power limits of the $m^{th}$ CUE and the $k^{th}$ pair of DUEs, and $P_{max}^c$ and $P_{max}^d$ are respectively the maximum transmission powers of the $m^{th}$ CUE and the $k^{th}$ pair of DUEs;

condition C5 indicates that a pair of DUEs multiplex a channel of one CUE at most;

condition C6 indicates that the channel of one CUE is multiplexed by one pair of DUEs at most;

condition C7 indicates that a task offloading strategy variable $s_m$ is an integer of 0 or 1; and condition C8 indicates the maximum computing resource limit of the edge computing server, and F is a number of the maximum CPU cycles that the edge computing server is capable of.

3. The method of multi-access edge computing task offloading based on D2D in IoV environment according to claim 2, wherein $v_m(s_m, p_m, p_k, \rho_{m,k})$ S2 comprises:

changing the function of the optimization problem to:

$$\max_{s^v} \max_{\rho_{m,k}, p_m, p_k} \sum_{m \in S} v_m(s_m, \rho_{m,k}, p_m, p_k)$$

s.t. C1: $t_m \leq T_m^{max}$
C2: $Pr(t_k \geq T_k^{max}) \leq P_0$
C3: $0 \leq p_m \leq P_{max}^c$
C4: $0 \leq p_k \leq P_{max}^d$ C5: $\Sigma_{m \in M} \rho_{m,k} \leq 1$
C6: $\Sigma_{k \in K} \rho_{m,k} \leq 1$
C7: $s_m \in \{0,1\}$
C8: $\Sigma_{m \in M} s_m C_m \leq F$ wherein $s^v$ is a task offloading strategy vector, S is a set of the CUEs choosing task offloading, and $S=\{m | s_m=1\}$;

decomposing the optimization problem into two independent sub-optimization problems, wherein the optimization problem is expressed as:

$$\max_{s^v} r(S)$$

wherein, under the set of CUEs-specific task offloading strategies S, r(S) is a sub-optimization problem about the transmission power and channel resource allocation mode as follows:

$$\max_{\rho_{m,k}, p_m, p_k} \sum_{m \in S} v_m(s_m, \rho_{m,k}, p_m, p_k)$$

s.t. C2: $Pr(t_k \geq T_k^{max}) \leq P_0$
C3: $0 \leq p_m \leq P_{max}^c$
C4: $0 \leq p_k \leq P_{max}^d$
C5: $\Sigma_{m \in M} \rho_{m,k} \leq 1$
C6: $\Sigma_{k \in K} \rho_{m,k} \leq 1$ wherein r(S) has an optimal solution r*(S), and the optimization problem is transformed into a sub-optimization problem about the task offloading strategy $s_m$ as follows:

$$\max_{s^v} r^*(S);$$

and substituting the time delays and energy consumptions of the local execution and the edge execution into benefits to obtain the sub-optimization problem r(S) of transmission power and channel resource allocation mode, wherein r(S) is expressed as:

$$\max_{\rho_{m,k}, p_m, p_k} \left\{ \sum_{m \in S} (\beta_T + \beta_E) - \sum_{m \in S} \left( \beta_T \frac{t_m^{off}}{t_m^{loc}} + \beta_E \frac{e_m^{off}}{e_m^{loc}} \right) \right\}$$

wherein $\Sigma_{m \in S}(\beta_T + \beta_E)$ is a constant, and r(S) is equivalent to:

$$\min_{\rho_{m,k}, p_m, p_k} \sum_{m \in S} \left( \beta_T \frac{t_m^{off}}{t_m^{loc}} + \beta_E \frac{e_m^{off}}{e_m^{loc}} \right).$$

4. The method of multi-access edge computing task offloading based on D2D in IoV environment according to claim 3, wherein, S3 comprises:
assuming that the $k^{th}$ pair of DUEs multiplexes the channel of the $m^{th}$ CUE, for this CUE-DUE multiplexing pair, simplifying the sub-optimization problem r(S) of transmission power and channel resource allocation mode to:

$$\min_{p_m, p_k} \left( \beta_T \frac{t_m^{off}}{t_m^{loc}} + \beta_E \frac{e_m^{off}}{e_m^{loc}} \right)$$

s.t. C2: $Pr(t_k \geq T_k^{max}) \leq P_0$
C3: $0 \leq p_m \leq P_{max}^c$
C4: $0 \leq p_k \leq P_{max}^d$ obtaining a limit condition satisfied by the $m^{th}$ CUE and the $k^{th}$ pair of DUEs transmission powers based on the reliability limit condition C2:

$$p_m \leq \frac{h_k p_k}{\gamma_0^d h_{m,k}} \left( \frac{e^{-\frac{\gamma_0^d \sigma^2}{h_k p_k}}}{1 - P_0} - 1 \right)$$

wherein $\gamma_0^d$ is a threshold of signal-to-noise ratio, and $\gamma_0^d$ is acquired according to the maximum time delay allowable to the $k^{th}$ pair of DUEs for the D2D communication;

obtaining the feasible regions of powers by combining the limit conditions satisfied by the $m^{th}$ CUE and the $k^{th}$ pair of DUEs transmission powers with C3 and C4 conditions; and computing the optimal transmission power of the $m^{th}$ CUE $p^*_m$ and the optimal transmission power of the $k^{th}$ pair of DUEs $p^*_k$ by using linear programming to solve the sub-optimization problem of transmission power.

5. The method of multi-access edge computing task offloading based on D2D in IoV environment according to claim 4, wherein, according to a fact that the CUEs and the DUEs multiplex channels randomly, the sub-optimization problem of channel resource allocation mode is transformed into a maximum weight matching problem in bipartite, and the Hungarian method is used to obtain the optimal channel resource allocation mode, and S4 comprises:

transforming the sub-optimization problem r(S) of transmission power and channel resource allocation mode into based on the optimal transmission power of the $m^{th}$ CUE $p^*_m$ and the optimal transmission power of the $k^{th}$ pair of DUEs $p^*_k$:

$$\max_{\rho_{m,k}} \sum_{m \in S} \sum_{k \in K} \rho_{m,k} v^*_m(s_m, \rho_{m,k}, p_m, p_k)$$

s.t. C5: $\Sigma_{m \in M} \rho_{m,k} \leq 1$
C6: $\Sigma_{k \in K} \rho_{m,k} \leq 1$ wherein $v^*_m(s_m, \rho_{m,k}, p_m, p_k)$ is an optimal benefit that is computed according to the optimal transmission power $p^*_m$ of the $m^{th}$ CUE and the optimal transmission power $p^*_k$ of the $k^{th}$ pair of DUEs in the case of assuming that the $k^{th}$ pair of DUEs multiplexes the channel of the $m^{th}$ CUE; and transforming the sub-optimization problem r(S) of transmission power and channel resource allocation mode into the maximum weight matching problem in bipartite; and obtaining the optimal channel resource allocation mode $p^*_{m,k}$ using the Hungarian algorithm for solution.

6. The method of multi-access edge computing task offloading based on D2D in IoV environment according to claim 5, wherein the optimization problem is transformed into the knapsack problem about the task offloading strategy, and the optimal task offloading strategy is obtained through the dynamic programming, and S5 comprises:

transforming the optimization problem into the sub-optimization problem about the task offloading strategy, based on the optimal transmission power of the $m^{th}$ CUE $p^*_m$ and the optimal transmission power of the $k^{th}$ pair of DUEs $p^*_k$, as well as the optimal channel resource allocation mode $\rho^*_{m,k}$:

$$\max \sum_{m=1}^{M} s_m r^*(S)$$

C7: $s_m \in \{0,1\}$
C8: $\Sigma_{m \in M} s_m C_m \leq F$; and obtaining the optimal task offloading strategy $s_m$ using the dynamic programming for solution, wherein the sub-optimization problem of task offloading strategy is a knapsack problem.

* * * * *